United States Patent [19]

Foster et al.

[11] 4,455,009
[45] Jun. 19, 1984

[54] ADJUSTABLE VEHICLE SEAT MOUNTING DEVICE

[75] Inventors: Danny S. Foster, Davenport; Daniel L. Burns, Muscatine, both of Iowa

[73] Assignee: Sears Manufacturing Co., Inc., Davenport, Iowa

[21] Appl. No.: 376,674

[22] Filed: May 10, 1982

[51] Int. Cl.³ .......................................... F16M 13/00
[52] U.S. Cl. .................................. 248/561; 248/429; 248/430
[58] Field of Search .............. 248/425, 429, 430, 420, 248/561; 297/308, 346

[56] References Cited

U.S. PATENT DOCUMENTS

| 3,100,617 | 8/1963 | Radke et al. ........................ 248/430 |
| 3,258,241 | 6/1966 | Oswald . |
| 3,310,274 | 3/1967 | Tanaka et al. . |
| 3,460,794 | 8/1969 | Colautti . |
| 3,469,812 | 9/1969 | Wonell et al. . |
| 3,582,033 | 6/1971 | LaFleche et al. . |
| 3,843,087 | 10/1974 | Adams . |
| 3,866,876 | 2/1975 | Adams . |
| 4,008,917 | 2/1977 | Sigwarth et al. . |
| 4,094,489 | 6/1978 | Yoshimura . |
| 4,194,716 | 3/1980 | Barecki et al. ................... 248/561 X |
| 4,384,701 | 5/1983 | Barley .............................. 248/638 X |

Primary Examiner—J. Franklin Foss
Assistant Examiner—David L. Talbott
Attorney, Agent, or Firm—Hosier, Niro & Daleiden

[57] ABSTRACT

An adjustable seat mounting mechanism is provided between a base part and a seat support part mounted for relative fore and aft movement. An adjustment mechanism is operatively associated between the base part and the seat support part for effecting adjustment between a locking mode preventing the fore and aft movement, an isolation mode permitting limited oscillatory movement between the base part and the seat part, and an unlocking mode to permit full fore and aft adjustment of the seat. A single manually manipulatable member is provided, movable with the seat, for effecting adjustment between the three modes.

22 Claims, 7 Drawing Figures

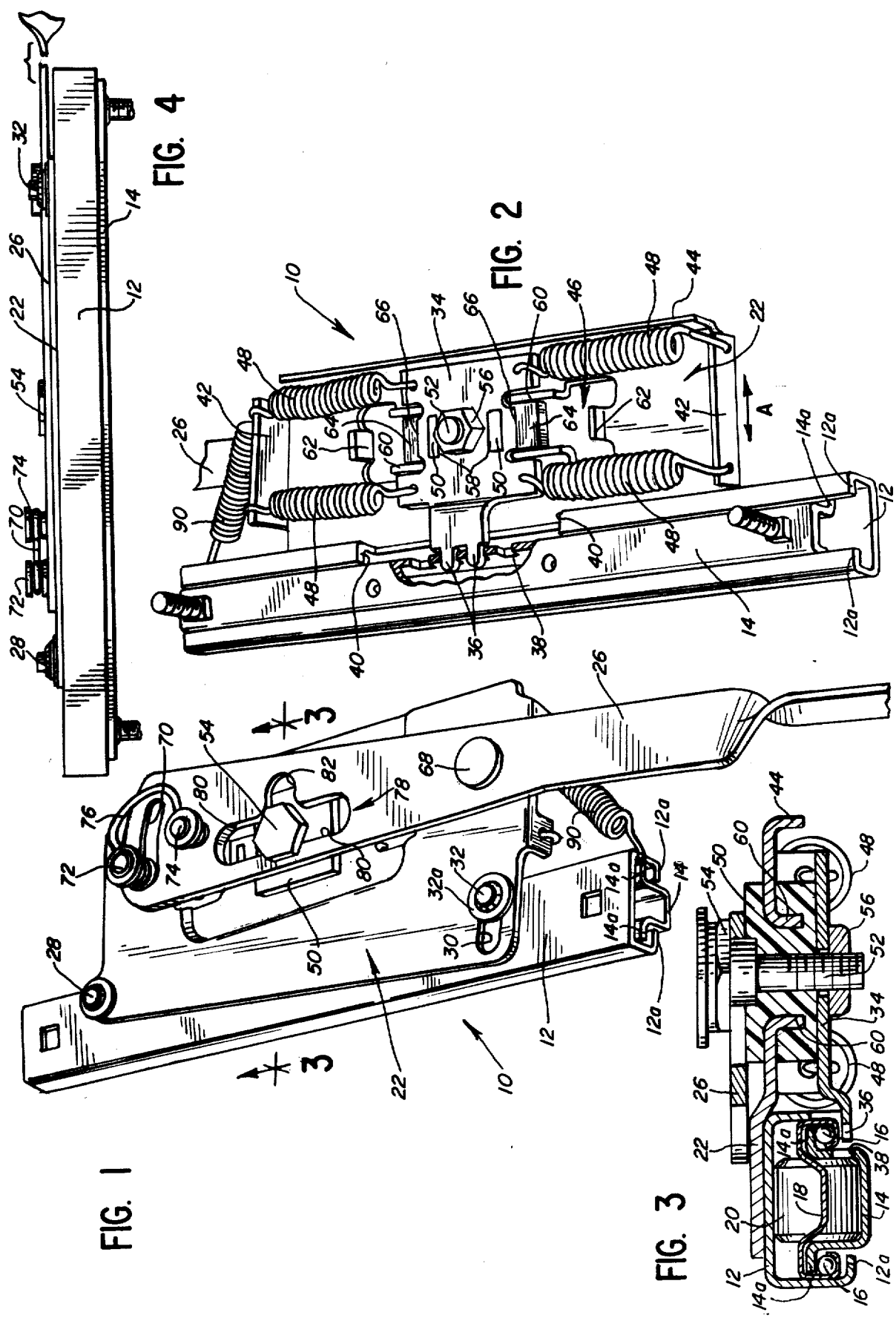

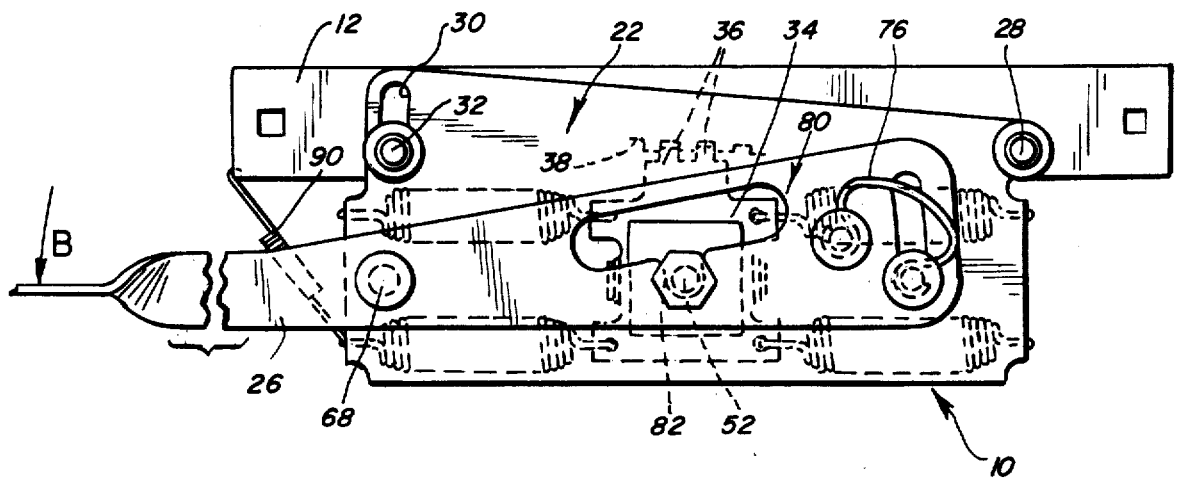
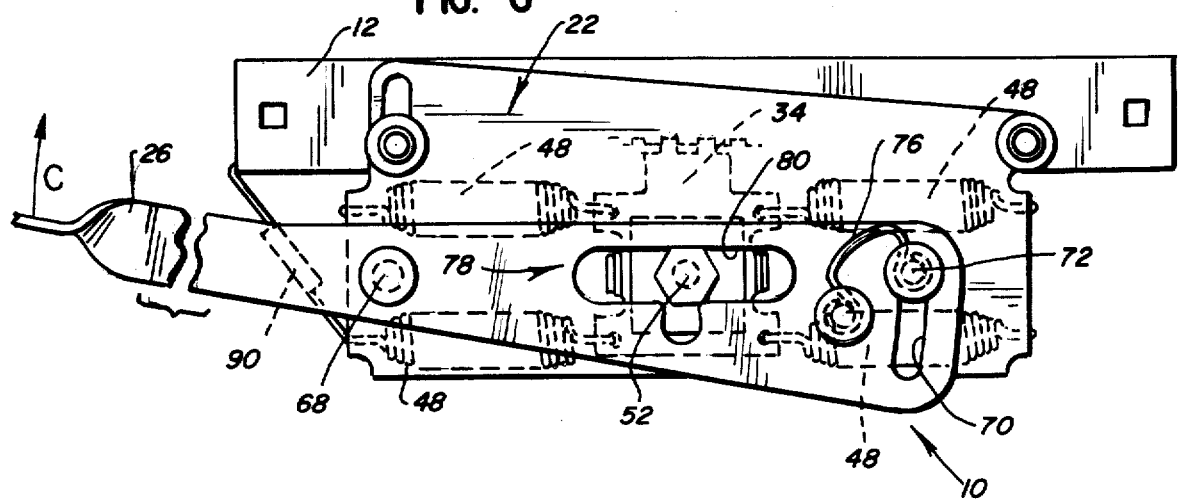
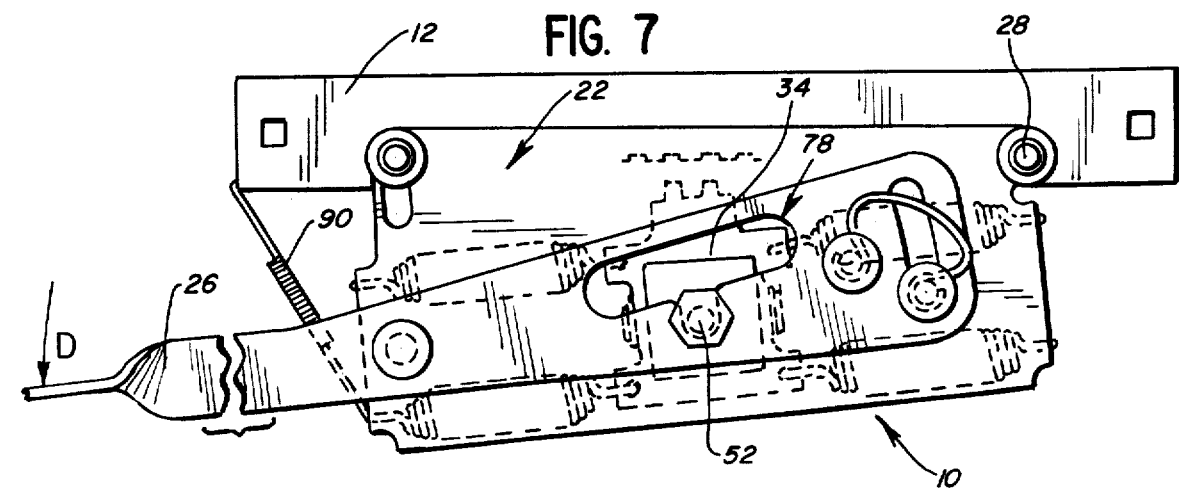

ADJUSTABLE VEHICLE SEAT MOUNTING DEVICE

BACKGROUND OF THE INVENTION

This invention relates to a new and improved adjustable vehicle seat mounting mechanism and particularly to a seat suspension system which provides for adjusting and locking modes as well as an isolation mode permitting limited oscillatory movement of the seat.

Conventional adjustable seat devices generally include a pair of laterally spaced, supporting apparatus having an individual latching mechanism interconnected between the supporting apparatus and operatively connected to a release handle. The supporting apparatus often takes the form of an upper support attached to the seat assembly, a lower support fixed to the floor of the vehicle and some type of slide mechanism interconnecting the upper and lower supports for forward and backward movement relative to the vehicle. A latch mechanism associated with the supporting apparatus permits the upper and lower supports to be locked in a position selected to accommodate the physical characteristics of the occupant of the seat.

Normally, a slide assembly interconnects the upper and lower support members. The slide assembly usually comprises a pair of cooperating, elongated U-shaped slide members having laterally formed portions of their sidewalls interconnected to one another by ball or roller bearings arranged to provide relatively frictionless adjustment.

Some seat mounting devices of the character described include means commonly referred to as fore and aft isolators which permit the vehicle seat to move both forward and backward to a limited degree under the control of a spring system in response to vehicle vibration. Such isolators are operative in the locked mode of the seat suspension system and accommodate vehicle vibration to partially isolate the seat occupant from such vibration.

An example of a vehicle seat suspension system which incorporates an isolator device is shown in U.S. Pat. No. 3,258,241 to W. C. Oswald, dated June 28, 1966. In that patent, a vibrationally isolated vehicle seat suspension is disclosed and includes means which will render the isolation mechanism inoperative by directly connecting the vehicle seat to the base at a predetermined fore and aft position of the seat. Known isolators as exemplified by Oswald have a number of drawbacks or problems. For instance, plural control handles or levers are required to fully operate the seat suspension system. One control is provided for fore and aft seat adjustment locking, and a second control is provided for activating or conditioning the isolator mechanism. This may be confusing to the occupant of the seat. In addition, one of the controls does not move with the seat as the seat is adjusted. This may prove hazardous when the occupant tries to locate a control handle which should desirably move with the occupant as the seat is adjusted.

A need, therefore, exists for an adjustable vehicular seat mounting device which incorporates an isolator mechanism wherein the adjusting, locking and isolation modes of the device are controlled by a single hand lever and wherein the control lever moves with the seat and occupant.

SUMMARY OF THE INVENTION

An object, therefore, of the present invention is to provide a new and improved adjustable seat mounting mechanism which incorporates isolator means to partially isolate a seat occupant from vibration.

Another object of the invention is to provide an adjustable seat mounting mechanism of the character described which is simple and controlled by a single operating lever.

A further object of the invention is to provide an adjustable seat mounting mechanism of the character described wherein the mechanism, including the single operating lever, moves with the seat and occupant.

In the exemplary embodiment of the invention, an adjustable seat mounting mechanism is disclosed and includes a slide assembly having a first part for attachment to a fixed base structure such as the floor of a vehicle, and a second part for attachment to a seat or other seat support structure. The slide assembly permits relative fore and aft movement of the seat in respect to the base structure. Latch means is operatively associated between the first and second parts of the slide assembly for locking the seat in a variety of fore and aft positions of adjustment. Isolation means permits limited fore and aft oscillatory movement of the seat while the mounting mechanism is in the locked position. Unitarily operable control means is operatively associated with the latch means and the isolation means to effect adjustment of the seat mounting mechanism between a locking mode of the latch means, an isolation mode rendering the isolation means effective, and an unlocking mode of the latch means to permit fore and aft adjustment of the seat.

The unitarily operable control means includes a single manually manipulatable member to effect the adjustment of the seat mounting mechanism between the aforesaid three modes.

The preferred structural embodiment of the invention disclosed herein includes an isolation bracket mounted on one of the parts of the slide assembly. The latch means is mounted on the isolation bracket for oscillatory movement relative thereto and for locking engagement with the other part of the slide assembly. Centering springs are provided between the isolation bracket and the latch means for resiliently resisting the oscillatory movement. Cushioned stop means is provided between the isolation bracket and the latch means for limiting the oscillatory movement.

The mechanism is primarily pivotally mounted, with the isolation bracket pivotally mounted on the one part of the slide assembly for moving the latch means bodily therewith into and out of locking engagement with the other part of the slide assembly. The single manually manipulatable control member comprises a hand lever pivotally mounted on the isolation bracket. The hand lever is operatively associated with the latch means for either permitting or preventing the oscillatory movement of the latch means relative to the isolation bracket when the latch means is in locking engagement with the other part of the slide assembly. The hand lever further is operative to pivot the isolation bracket and thereby move the latch means out of engagement with the other part of the slide assembly.

Other objects, features and advantages of the invention will be apparent from the following detailed description taken in connection with the accompanying drawings. Although the adjustable seat mounting mechanism is described herein as being applicable for mounting a vehicle seat, it will be apparent that the novel features and advantages thereof are equally applicable for other seat mounting applications.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a front, top perspective view of the adjustable seat mounting mechanism of the present invention;

FIG. 2 is a rear, bottom perspective view of the mechanism;

FIG. 3 is a vertical sectional view taken generally along line 3—3 of FIG. 1;

FIG. 4 is a side elevational view of the mechanism;

FIG. 5 is a top plan view of the mechanism, in its locking mode;

FIG. 6 is a top plan view of the mechanism, in its isolation mode; and

FIG. 7 is a top plan view of the mechanism, in its unlocked or adjustment mode.

DETAILED DESCRIPTION OF THE INVENTION

Referring to the drawings in greater detail, and first to FIGS. 1-4, an adjustable seat mounting mechanism in accordance with the present invention is shown and generally designated 10. As with many conventional adjustable vehicle seat devices, generally a pair of laterally spaced, supporting apparatus have an individual latching means interconnected one to the other and operatively connected to a release handle. The supporting apparatus normally takes the form of an upper support attached to the seat assembly, a lower support fixed to the floor of the vehicle and some type of slide mechanism interconnecting the upper and lower supports for movement relative to the front and rear of the vehicle.

As shown in FIGS. 1-4, the slide assembly includes two parts comprising a pair of complementary, elongated, U-shaped slide rails 12 and 14. Slide rail 12 comprises an upper part of the slide assembly and is adapted for securing to the vehicle seat or other vehicle seat support system. Slide rail 14 comprises a lower part of the slide assembly for attachment to a fixed base structure such as the floor of a vehicle. Laterally formed portions 12a of slide rail 12 and 14a of slide rail 14 interconnect the slide rail and sandwich ball bearings 16 (FIG. 3) between the laterally formed portions. A movable positioning plate 18 also positions roller bearings 20 between upper and lower slide rails 12 and 14, respectively. This slide rail assembly construction is generally conventional and permits relative fore and aft movement of the seat in respect to the base structure.

The adjustable seat mounting mechanism of the present invention is unitarily controlled for effecting adjustment of the seat between a locking mode, an isolation mode and an unlocking mode of adjustment. More particularly, the mechanism includes an isolation bracket, generally designated 22, a latch plate 34 and a single manually manipulated hand lever 26.

Isolation bracket 22 is pivotally mounted at 28 (FIG. 1) to upper slide rail 12, at the rear of the bracket. The front of the bracket has a slot 30 extending transversely of the upper slide rail and through which a guide bolt 32 extends. The guide bolt has an enlarged head portion 32a overlying the isolation bracket on opposite sides of slot 30 to hold the bracket in stabilized position against the upper slide rail but to permit movement of the bolt within slot 30 as the bracket pivots about bolt 28.

As best seen in FIG. 2, latch plate 34 generally is mounted on isolation bracket 22 for movement bodily therewith in the direction of doubled-headed arrow A (FIG. 2) relative to slide rails 12, 14. This pivotal movement of the isolation bracket and the latch plate moves locking teeth 36 into and out of engagement with locking holes 38 in lower slide rail 14. It can be seen that an elongated notch 40 is cut out of one of the laterally, inwardly formed portions of upper slide rail 12 in order to accommodate limited fore and aft movement of latch plate 34 and locking teeth 36 relative to the upper slide rail. This accommodates the limited oscillatory movement in the isolation mode of the mechanism, as described in greater detail hereinafter.

Thus, latch plate 34, with its locking teeth 36, is moved into and out of locking engagement with lower slide rail 14 by pivoting isolation bracket 22 about bolt 28 relative to upper slide rail 12.

Still referring to FIG. 2, latch plate 34 is mounted on isolation bracket 22 for limited oscillatory movement relative thereto, and thus limited oscillatory movement between the upper and lower slide rails while the rails are in locked condition. More particularly, isolation bracket 22 has two end flanges 42, a slide flange 44 and a cut-out elongated aperture, generally designated 46. Four centering springs 48 are secured between end flanges 42 and latch plate 34 to resist the oscillatory movement. A slider block 50 (FIG. 3) is interlocked to latch plate 34 by a shoulder bolt 52 having an enlarged head portion 54 on the top of the mechanism and a nut 56 on the bottom of the mechanism. The slider block is fabricated of plastic material and portions thereof can be seen through small apertures 58 (FIG. 2) in latch plate 34. The slider block moves with the latch plate 34 and is guided for movement relative to isolation bracket 22 by a pair of generally parallel flanges 60 of the isolation bracket defining the sides of aperture 46 in the bracket.

Stop means is provided between the isolation bracket and the latch plate for limiting the relative oscillatory movement therebetween. More particularly, a pair of small flanges 62 are inwardly turned from isolation bracket 22 at opposite ends of aperture 46. Rubber cushioning bumpers 64 are carried by flanges 66 of latch plate 34 for abutting the stop flanges 62 for cushioning the oscillatory movement at the extreme ends thereof.

Unitarily operable control means is operatively associated between latch plate 34 and isolation bracket 22 to effect adjustment of the seat mounting mechanism 10 between a locking mode of the latch plate, an isolation mode to permit limited oscillatory movement while in the locking mode, and an unlocking mode of the latch plate to permit full fore and aft adjustment of the seat. More particularly, the unitary control means includes single hand lever 26 which is manually manipulatable to effect adjustment between the three modes.

Referring to FIG. 1, hand lever 26 is pivoted by a pivot pin 68 to isolation bracket 22 forwardly of the bracket and the hand lever. The rear of the lever has a slightly arcuate slot 70 extending generally transversely to slide rails 12, 14 and through which a stationary pin 72 extends. Pin 72 is fixed to isolation bracket 22 near the rear thereof. A third pin 74 is fixed to hand lever 26 forwardly of pin 72 and an over-center spring 76 is secured between pins 72, 74.

Still referring to FIG. 1, a T-shaped slot, generally designated 78, is formed in hand lever 26 between pins 68 and 74. The slot has a cross portion 80 and a leg portion 82 and is dimensioned to capture shoulder bolt 52 therewithin, with the enlarged head portion 54 of the shoulder bolt overlying the top of hand lever 26 about the periphery of the slot. As will be understood hereinafter, cross portion 80 of the T-shaped slot permits relative oscillatory movement of the latch plate and lower slide rail in the oscillatory mode of the mechanism, while leg portion 82 of the T-shaped slot prevents the oscillatory movement.

Referring now to FIGS. 5-7, the operation of the adjustable seat mounting mechanism of the present invention will be described.

FIG. 5 shows the mechanism in its locked, non-oscillatory condition. It can be seen that the front of isolation bracket 22 has been pivoted about pin 28 in the direction of arrow "B" to an extreme position wherein locking teeth 36 of latch plate 34 are in engagement with selected ones of notches 38 in the lower slide rail. In this position, hand lever 26 is in a position about pivot pin 68 so as to seat shoulder bolt 52 in the leg portion 82 of T-shaped slot 80 in the hand lever. In this position, the bolt prevents any oscillatory movement between the latch plate and the isolation bracket. This also prevents any relative movement between the upper and lower slide rails. Hand lever 26 is maintained in this position by over-center spring 76.

In order to adjust the mechanism to its isolation mode, reference is made to FIG. 6. In this position, isolation bracket 22 and latch plate 34 still are in their locked condition, but hand lever 26 has been moved in the direction of arrow "C", about pivot pin 68, so as to position shoulder bolt 52 in cross portion 80 of T-shaped slot 78. In order to move to this position, over-center spring 76 is overcome while pin 72 moves within slot 70 of the hand lever. In the isolation mode of FIG. 6, limited oscillatory movement of latch plate 34 relative to isolation bracket 22 is permitted under the resistance of biasing springs 48. Consequently, limited oscillatory movement is afforded between upper and lower slide rails 12 and 14, respectively. In the isolation mode, latch plate 34 still remains in locked condition with the lower slide rail, as shown in FIG. 6. It should be understood that hand lever 26 can be moved back and forth between the fully locked mode of FIG. 5 and the isolation mode of FIG. 6 as exemplified by the arrows B and C.

In order to adjust the position of the upper and lower slide rails, and thus adjust the position of the seat, hand lever 26 is moved in the direction of arrow "D" as shown in FIG. 7, to pivot isolation bracket 22 and the entire mechanism about pin 28. In moving to this position, shoulder bolt 52 moves into the leg portion of T-shaped slot 78 and the isolation bracket is moved against the force of a latch spring 90 fixed between the isolation bracket and upper slide rail 12. By overcoming the biasing force of latch spring 90, isolation bracket 22 moves latch plate 34 bodily therewith. Consequently, locking teeth 36 of the latch plate are moved out of locking engagement with the notches of the lower slide rail, and the mechanism can be selectively adjusted to a new position of the seat. On release of hand lever 26, latch spring 90 will pivot the isolation bracket and latch plate back to the locking mode of FIG. 5, whereupon the mechanism can be easily adjusted into and out of its isolation mode of FIG. 6.

Thus, it can be seen that a new and improved adjustable seat mounting mechanism has been provided to afford three distinct modes of operation; a locking mode of the latch means, an isolation mode rendering the isolation means effective, and an unlocking mode of the latch means to permit full fore and aft adjustment of the seat. The mechanism is controlled through a single manually manipulatable member, and the control mechanism, including the manual hand lever, moves with the seat at all times.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An adjustable seat mounting mechanism, comprising:
   a slide assembly having a first part for attachment to a fixed base structure and a second part for attachment to a seat or seat support structure to permit relative fore and aft movement of the seat in respect to the base structure;
   latch means mounted on said second part for movement with said seat and for locking engagement with said first part to lock said seat in a variety of fore and aft positions of adjustment;
   isolation means mounted on said second part for movement with said seat and permitting limited fore and aft movement of said seat while in locked position; and
   unitarily operable control means mounted on said second part for movement with said seat and operatively associated with said latch means and said isolation means to effect adjustment of the seat mounting mechanism between a locking mode of said latch means, an isolation mode rendering said isolation means effective, and an unlocking mode of said latch means to permit fore and aft adjustment of the seat.

2. The adjustable seat mounting mechanism of claim 1 wherein said control means includes a single manually manipulatable member to effect said adjustment of the seat mounting mechanism between said three modes.

3. The adjustable seat mounting mechanism of claim 2 wherein said single manually manipulatable member comprises a pivoted hand lever.

4. The adjustable seat mounting mechanism of claim 1 wherein said isolation means includes an isolation bracket mounted on the second part of said slide assembly, and said latch means is mounted on said isolation bracket for oscillatory movement relative thereto and for locking engagement with the first part of said slide assembly.

5. The adjustable seat mounting mechanism of claim 4, including biasing means between said isolation bracket and said latch means for resiliently resisting said oscillatory movement.

6. The adjustable seat mounting mechanism of claim 4, including stop means between said isolation bracket and said latch means for limiting said oscillatory movement.

7. The adjustable seat mounting mechanism of claim 6 wherein said stop means includes cushion means.

8. The adjustable seat mounting mechanism of claim 4 wherein said isolation bracket is pivotally mounted on the second part of the slide assembly for moving said latch means bodily therewith into and out of locking engagement with the first part of said slide assembly.

9. The adjustable seat mounting mechanism of claim 1, including biasing means resisting said limited fore and aft movement of said seat.

10. An adjustable seat mounting mechanism, comprising:
a slide assembly having a first part for attachment to a fixed base structure and a second part for attachment to a seat or seat support structure to permit relative fore and aft movement of the seat in respect to the base structure;
latch means operatively associated between said first and second parts of said slide assembly for locking said seat in a variety of fore and aft positions of adjustment;
isolation means permitting limited fore and aft movement of said seat while in locked position, said isolation means including an isolation bracket pivotally mounted on one part of the slide assembly, said latch means being mounted on said isolation bracket for oscillatory movement relative thereto, said isolation bracket moving said latch means bodily therewith into and out of locking engagement with the other part of said slide assembly; and
unitarily operable control means operatively associated with said latch means and said isolation means to effect adjustment of the seat mounting mechanism between a locking mode of said latch means, an isolation mode rendering said isolation means effective, and an unlocking mode of said latch means to permit fore and aft adjustment of the seat, including a control lever pivotally mounted on said isolation bracket, said control lever having means operatively associated with said latch means for either permitting or preventing said oscillatory movement of said latch means when in locking engagement with the other part of said slide assembly, said control lever further being operative to pivot said isolation bracket and move said latch means out of engagement with the other part of said slide assembly.

11. The adjustable seat mounting mechanism of claim 10 wherein said means on said control lever comprises a T-shaped slot for receiving a portion of said latch means, the cross of the T-shaped slot permitting said oscillatory movement of the latch means and the leg of the T-shaped slot preventing said oscillatory movement of the latch means.

12. The adjustable seat mounting mechanism of claim 10 wherein said isolation bracket is mounted on the second part of said slide assembly for movement with said seat.

13. A seat suspension system comprising:
a base part;
a seat support part mounted for relative fore and aft movement in respect to said base part; and
an adjustment assembly entirely mounted on said seat support part for movement with the seat for effecting adjustment of the seat suspension system between a locking mode engageable with said base part and preventing said fore and aft movement, an isolation mode permitting limited oscillatory movement between said base part and said seat support part, and an unlocking mode to permit fore and aft adjustment of the seat, and including a single manually manipulatable member for effecting said adjustment between said three modes.

14. The seat suspension system of claim 13 wherein said single manually manipulatable member comprises a pivoted hand lever.

15. The seat suspension system of claim 13 wherein said adjustment assembly includes an isolation bracket mouned on said seat support part, and latch means mounted on said isolation bracket for oscillatory movemnt relative thereto and for locking engagement with the base part.

16. The seat suspension system of claim 15, including biasing means between said isolation bracket and said latch means for resiliently resisting said oscillatory movement.

17. The seat suspension system of claim 15, including stop means between isolation bracket and said latch means for limiting said oscillatory movement.

18. The seat suspension system of claim 17 wherein said stop means includes cushion means.

19. The seat suspension system of claim 15 wherein said isolation bracket is pivotally mounted on said seat support part for moving said latch means bodily therewith into and out of locking engagement with the base part.

20. The seat suspension system of claim 13, including biasing means resisting said limited fore and aft movement of said seat.

21. A seat suspension system comprising:
a base part;
a seat support part mounted for relative fore and aft movement in respect to said base part; and
adjustment means operatively associated between said base part and said seat support part for effecting adjustment of the seat suspension system between a locking mode preventing said fore and aft movement, an isolation mode permitting limited oscillatory movement between said base part and said seat support part, and an unlocking mode to permit fore and aft adjustment of the seat, said adjustment means including an isolation bracket pivotally mounted on one of said parts, latch means pivotally mounted on said isolation bracket for oscillatory movement relative thereto and for movement bodily therewith into and out of locking engagement with the other part, a single manually manipulatable control lever pivotally mounted on said isolation bracket, said control lever having means operatively associated with said latch means for either permitting or preventing said oscillatory movement of said latch means when in locking engagement with said other part, said control lever further being operative to pivot said isolation bracket and move said latch means out of engagement with said other part.

22. The seat suspension system of claim 21 wherein said isolation bracket and control lever are mounted on said seat support part for movement with the seat.

* * * * *